(12) United States Patent
Grable

(10) Patent No.: US 7,677,666 B2
(45) Date of Patent: Mar. 16, 2010

(54) DISC RECLINER ASSEMBLY INCORPORATED INTO A SEATBACK/SEAT BASE PIVOT ASSOCIATED WITH A VEHICLE SEAT

(75) Inventor: David Grable, Clinton Township, MI (US)

(73) Assignee: BAE Industries, Inc., Warren, MI (US)

( * ) Notice: Subject to any disclaimer, the term of this patent is extended or adjusted under 35 U.S.C. 154(b) by 213 days.

(21) Appl. No.: 11/971,699

(22) Filed: Jan. 9, 2008

(65) Prior Publication Data

US 2009/0174247 A1 Jul. 9, 2009

(51) Int. Cl.
*B60N 2/02* (2006.01)
(52) U.S. Cl. .................................. 297/366; 297/367 R
(58) Field of Classification Search .......... 297/365–368
See application file for complete search history.

(56) References Cited

U.S. PATENT DOCUMENTS

| | | | |
|---|---|---|---|
| 4,700,587 A | 10/1987 | Bianchi et al. |
| 5,216,936 A | 6/1993 | Baloche et al. |
| 5,524,970 A | 6/1996 | Kienke et al. |
| 5,593,210 A | 1/1997 | Schwarzbich et al. |
| 5,664,837 A | 9/1997 | Takagi et al. |
| 5,681,086 A | 10/1997 | Baloche et al. |
| 5,718,482 A | 2/1998 | Robinson |
| 5,794,479 A | 8/1998 | Schwarzbich et al. |
| 5,896,973 A | 4/1999 | Hochmuth et al. |
| 6,032,777 A | 3/2000 | Denis et al. |
| 6,039,400 A | 3/2000 | Yoshida et al. |
| 6,102,480 A | 8/2000 | Asano et al. |
| 6,112,370 A | 9/2000 | Blanchard et al. |
| 6,120,098 A | 9/2000 | Magyar et al. |
| 6,149,235 A | 11/2000 | Fahim |
| 6,164,723 A | 12/2000 | Ganot |
| 6,267,218 B1 | 7/2001 | Hochmuth et al. |
| 6,267,443 B1 | 7/2001 | Kurita et al. |
| 6,312,053 B1 | 11/2001 | Magyar |

(Continued)

FOREIGN PATENT DOCUMENTS

EP 0502774 A1 9/1992

(Continued)

*Primary Examiner*—Sarah B McPartlin
(74) *Attorney, Agent, or Firm*—Gifford, Krass, Sprinkle, Anderson & Citkowski, P.C.

(57) ABSTRACT

A seat recliner assembly established at a hinge location between a seat bottom and a pivotally associated seat back including a base plate and an inwardly teethed and package supporting sector secured to the seat back and seat bottom, respectively and sandwiched together in selectively rotatable fashion relative to define a component receiving space therebetween. A shaft projects through an aperture of a rotatably slaved cam situated within the space. A pair of locking pawls with exteriorly toothed surfaces are displaceable to engage with inwardly teethed locations of the package supporting sector. A pair of anti-chuck pawls are selectively engagable both by the cam and with the locking pawls. The cam is biased in a first rotational locking condition to influence the anti-chuck pawls outwardly against the locking pawls. The cam is rotated in an opposite and counter-biasing direction, thereby directly contacting the locking pawls and pivoting the same such that their exteriorly toothed surfaces are inwardly disengaged from the teethed sector, permitting rotational between the base plate and package sector.

23 Claims, 4 Drawing Sheets

U.S. PATENT DOCUMENTS

| | | | |
|---|---|---|---|
| 6,325,458 B1 | 12/2001 | Rohee et al. | |
| 6,332,649 B1 | 12/2001 | Vossmann et al. | |
| 6,402,249 B1 | 6/2002 | Rohee et al. | |
| 6,474,740 B1 | 11/2002 | Kondo et al. | |
| 6,520,583 B1 | 2/2003 | Bonk | |
| 6,561,585 B2 | 5/2003 | Cilliere et al. | |
| 6,616,241 B1 | 9/2003 | Masuda et al. | |
| 6,619,744 B2 | 9/2003 | Reubeuze et al. | |
| 6,629,733 B2 * | 10/2003 | Matsuura et al. | 297/366 |
| 6,640,952 B2 | 11/2003 | Baloche et al. | |
| 6,648,414 B2 * | 11/2003 | Ikegaya et al. | 297/367 R |
| 6,666,515 B2 * | 12/2003 | Asano et al. | 297/366 |
| 6,669,297 B2 | 12/2003 | Cilliere et al. | |
| 6,722,738 B2 | 4/2004 | Uramichi et al. | |
| 6,726,281 B2 | 4/2004 | Baloche et al. | |
| 6,758,525 B2 | 7/2004 | Uramichi et al. | |
| 6,762,579 B2 | 7/2004 | Babcock et al. | |
| 6,805,650 B2 | 10/2004 | Branov et al. | |
| 6,843,533 B1 | 1/2005 | Miyata et al. | |
| 6,854,802 B2 * | 2/2005 | Matsuura et al. | 297/367 R |
| 6,880,887 B2 | 4/2005 | Hoshihara et al. | |
| 6,883,869 B2 | 4/2005 | Liu et al. | |
| 6,890,034 B2 | 5/2005 | Bonk | |
| 6,908,156 B1 | 6/2005 | Park et al. | |
| 6,910,737 B2 | 6/2005 | Hosokawa et al. | |
| 6,910,738 B2 | 6/2005 | Bonk | |
| 6,923,504 B1 | 8/2005 | Liu et al. | |
| 6,991,294 B2 | 1/2006 | Choi et al. | |
| 6,991,295 B2 | 1/2006 | Peters et al. | |
| 7,021,715 B2 | 4/2006 | Umezaki et al. | |
| 7,066,541 B2 | 6/2006 | Uramichi et al. | |
| 7,100,987 B2 | 9/2006 | Volker et al. | |
| 7,144,082 B2 | 12/2006 | Ohba et al. | |
| 7,150,503 B2 | 12/2006 | Ohba et al. | |
| 7,165,813 B2 | 1/2007 | Tame | |
| 7,168,764 B2 | 1/2007 | Reubeuze et al. | |
| 7,195,318 B2 | 3/2007 | Cha et al. | |
| 7,222,919 B2 | 5/2007 | Uramichi et al. | |
| 7,334,843 B2 * | 2/2008 | Yamada et al. | 297/367 R |
| 7,341,311 B2 * | 3/2008 | Ohba | 297/367 R |
| 2002/0175548 A1 | 11/2002 | Asano et al. | |
| 2005/0146187 A1 | 7/2005 | Volker et al. | |
| 2005/0168034 A1 * | 8/2005 | Fast | 297/367 |
| 2006/0055222 A1 | 3/2006 | Bonk et al. | |
| 2006/0145523 A1 | 7/2006 | Yamada | |
| 2006/0170269 A1 | 8/2006 | Oki | |
| 2007/0057558 A1 | 3/2007 | Kojima | |
| 2007/0096530 A1 | 5/2007 | Ohba et al. | |
| 2007/0108824 A1 | 5/2007 | Lange | |
| 2007/0108825 A1 | 5/2007 | Yamada et al. | |
| 2007/0132294 A1 | 6/2007 | Yamada et al. | |

FOREIGN PATENT DOCUMENTS

EP        0967112  A2        12/1999

* cited by examiner

DISC RECLINER ASSEMBLY INCORPORATED INTO A SEATBACK/SEAT BASE PIVOT ASSOCIATED WITH A VEHICLE SEAT

FIELD OF THE INVENTION

The present invention is generally directed to a seat recliner assembly operable at a pivot connection established at a hinge location between a seat bottom and a seat back. More specifically, the present invention discloses a chuck reducing disc recliner package incorporating respective pairs of locking pawls and anti-chuck pawls operating in cooperation with a central and rotatably actuating cam, the package being seatingly arranged, in part, within an interiorly toothed and circular shaped plate for providing enhanced distribution of necessary sector clearances across an inner surface area associated with the package to reduce the incidences of chucking.

BACKGROUND OF THE INVENTION

The prior art is well documented with examples of seat recliner devices, and such as which can be incorporated into a vehicle seat whereby the seat back is capable of being rotatably mounted about a crosswise extending hinge defined with the seat bottom. Such circular/rotary disc package arrangements are particularly suited for seating applications, and in order to provide a dependable assembly for incrementally adjusting the seatback relative to the seat bottom, as well as optionally for facilitating dumping of the seatback against the seat bottom.

U.S. Pat. No. 6,854,802, issued to Matsuura et al., teaches a seat recliner having a base mounted to a first seat member. A seal recliner includes a gear mounted to a second seat member and which is rotatable relative to the base. The gear has first teeth along a peripheral face of the gear. The seat recliner includes a locking member movable inside the first teeth and which includes second interengageable teeth. A cam is configured to rotate the locking member to engage the first and second teeth with each other for establishing an angle between the first and second seat members. A guide is located on the base and exhibits a guide face for slidably guiding the locking member to engage the first and second teeth with each other. The guide extends radially from a vicinity of the first teeth to a vicinity of the cam. A near side of the guide relative to the first teeth and the locking member define a gap therebetween.

A further series of related recliner devices are set forth in U.S. Pat. No. 6,648,414 (Ikegaya et al.), U.S. Pat. No. 6,666,515 (Asano et al.) and U.S. Pat. No. 6,629,733 (Matsuura et al.). Each of the above-referenced are architecturally similar to the Matsuura et al. recliner.

Other references worthy of mention include the automotive seat recliner apparatus of Ohba, U.S. Pat. No. 7,144,082, as well as the seat reclining device of Ohba, U.S. Pat. No. 7,150,503. In the specific example of the reclining device of U.S. Pat. No. 7,150,503, a base member is coupled to one of a seat cushion or a seat back, with a gear teethed pivot member being coupled to the other. A shaft member is formed integrally with the base member and has a cylindrical shaft surface. A lock member includes first and second opposite end surfaces, with lock teeth formed in the second end surface. A cam member is provided for moving the lock member to engage the lock teeth with the gear teeth, first and second guide members being formed integrally with the base member to guide the lock member along a path around the shaft member and a stress absorbing protrusion formed integrally with the shaft surface on an opposite side of the shaft member from the lock teeth.

SUMMARY OF THE INVENTION

The present invention is generally directed to a seat recliner assembly operable at a pivot connection established at a hinge location between a seat bottom and a seat back. More specifically, the present invention discloses a chuck reducing disc recliner package incorporating respective pairs of locking pawls and anti-chuck pawls operating in cooperation with a central and rotatably actuating cam, the package being seatingly arranged in part, within an interiorly toothed and circular shaped plate for providing enhanced distribution of necessary sector clearances across an inner surface area associated with the package to reduce the incidences of chucking.

A base plate is secured to a first selected one of the seat back and seat bottom, whereas an inwardly teethed and package supporting sector is secured to a second selected one of the seat back and seat bottom. The base plate and package supporting sector are sandwichingly engaged in selectively rotatable fashion relative to one another to define a component receiving space therebetween.

A shaft projects through the base plate and supporting sector. A cam is provided with a generally centrally located aperture through which the shaft extends. The cam is supported within the component receiving space in a selected and rotationally biased and slaved fashion relative to the shaft. In one application, the shall includes a keyed portion defined relative to the inner walls of the cam aperture, and further such that a misalignment tolerancing is defined between the keyed portion and the inner facing surfaces of the cam aperture, this contributing to the sector clearance capabilities of the package design.

A pair of locking pawls are provided, each exhibiting an outer arcuate and exteriorly toothed surface and which are selectively displaceable to engage with inwardly teethed locations associated with the package supporting sector. A pair of anti-chuck pawls are associated with further locations of the component receiving space, and are selectively engagable both by the cam and with the locking pawls.

In operation, the cam is normally biased in a first rotational locking condition, in order to influence the anti-chuck pawls outwardly against the locking pawls. The cam is further rotated in an opposite and counter-biasing direction, thereby directly contacting the locking pawls and pivoting the same such that the exteriorly toothed surfaces are inwardly disengaged from the teethed sector, permitting rotational between the base plate and package supporting sector. The arrangement of the cam, locking pawls and anti-chuck pawls, in combination with the misalignment tolerancing between the keyed location of shaft and cam aperture, provides the necessary sector clearances across the package defining space, again in order to reduce the incidences of chucking and locking of package components.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
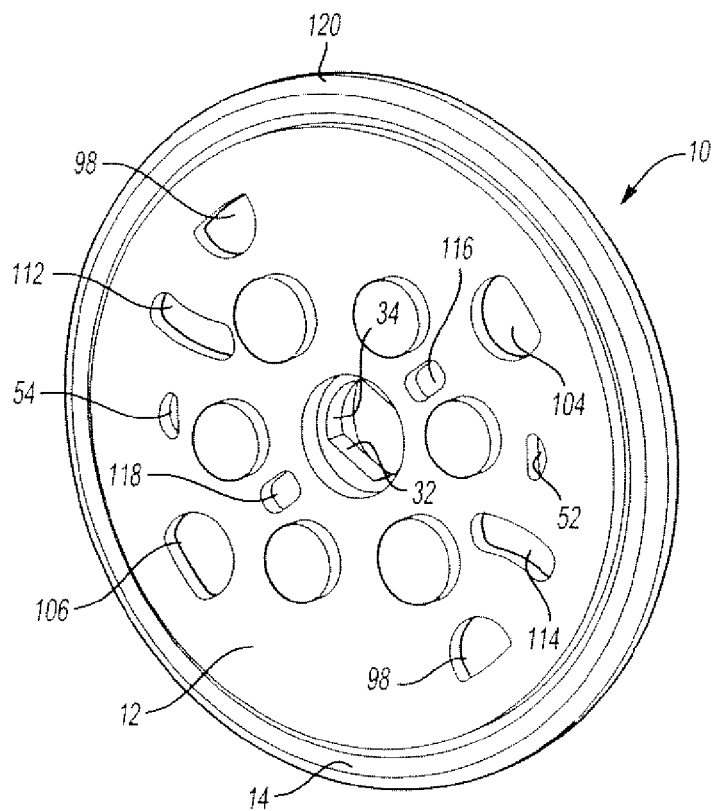
FIG. 1 is a first perspective view of an assembled disc recliner assembly according to the present inventions.
Figure 2:
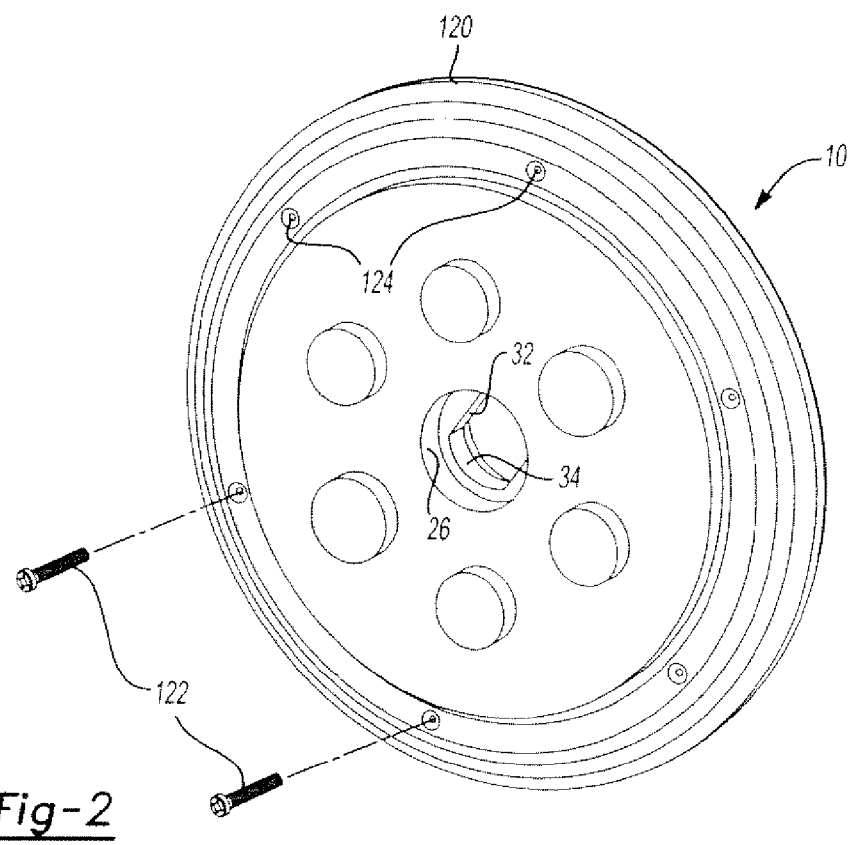
FIG. 2 is a rotated and second perspective view of the disc recliner assembly illustrated in FIG. 1.

Referring now to FIGS. 1 and 2, first and second rotated perspective views are illustrated at 10 of an assembled disc recliner assembly according to the present invention. As will be described in further detail, the present invention teaches a seat recliner assembly operable at a pivot connection established at a hinge location between a seat bottom and a seat back (not shown). More specifically, the present invention discloses a chuck reducing disc recliner package incorporating respective pairs of locking pawls and anti-chuck pawls operating in cooperation with a central and rotatably actuating cam, the package being seatingly arranged, in part, within an interiorly toothed and circular shaped plate for providing enhanced distribution of necessary sector clearances across an inner surface area associated with the package to reduce the incidences of chucking.

Figure 3:
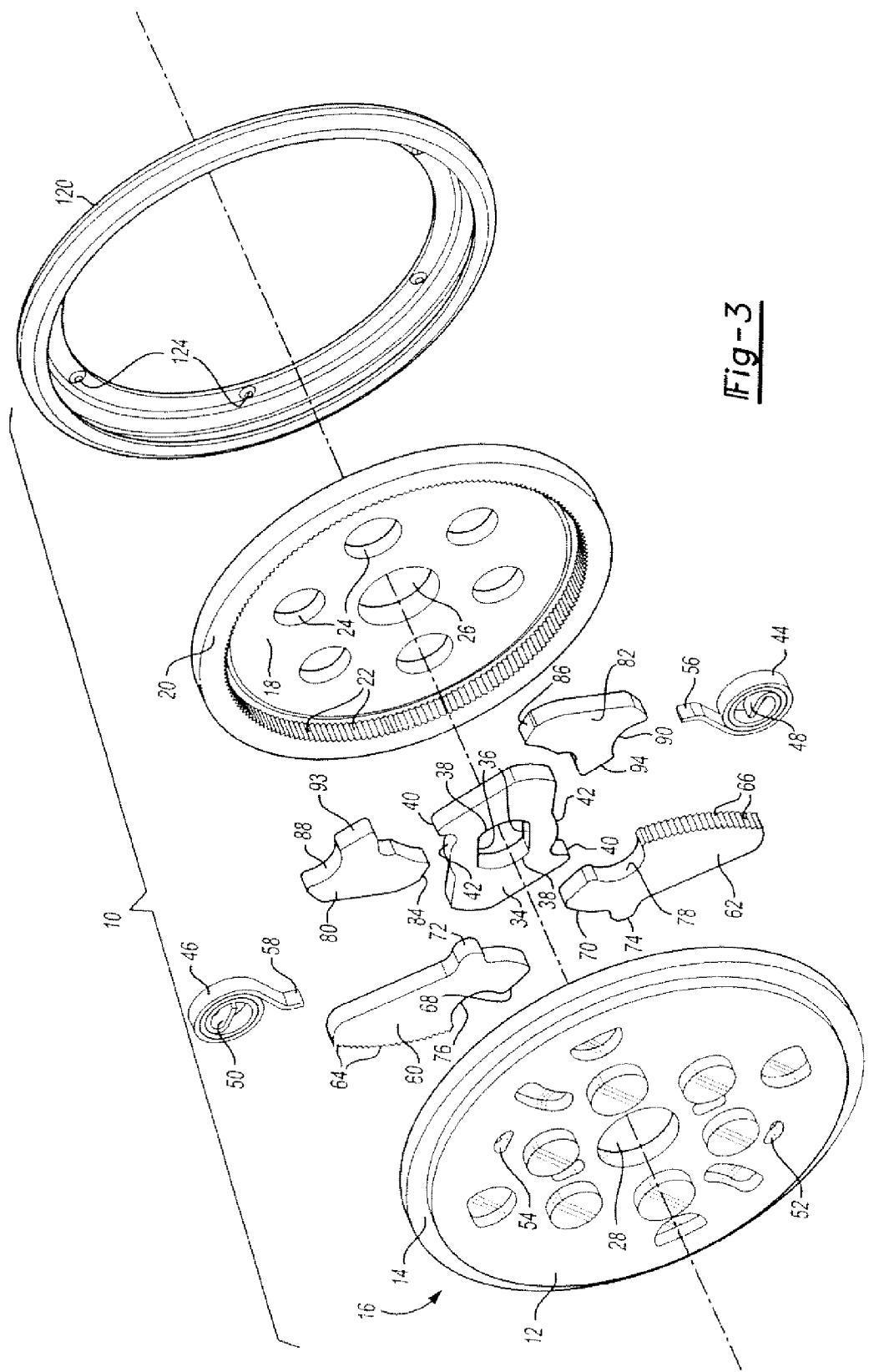
FIG. 3 is an exploded view of disc recliner assembly as substantially illustrated in FIG. 1, in particular showing the features of the inwardly teethed and package supporting sector, and within which are defined the features of the central rotatable and spring biased cam, the pairs of teethed locking and biasing anti-chuck pawls, as well as the outer sandwiching base support and retention ring.

With reference to FIG. 3, an exploded view is shown of the disc recliner package assembly 10, and such as substantially illustrated in FIG. 1. Prior to engaging in a detailed structural explanation of the components associated with the disc recliner package, it is understood that the components are typically constructed from such as a high-grade steel or other material exhibiting suitable mechanical properties. Furthermore, and as will be described below, the disc recliner package assembly may be configured to operate in either left or right side seat configuration, and as will he appreciated by reference to the mirrored structural arrangements shown in each of FIGS. 4 and 6.

A base plate exhibits a circular outer profile with an inner surface 12 bounded by an outwardly perimeter extending lip 14. As shown, the lip 14 is offset from the associated outer profile of the base inner surface 12, and such that the lip 14 may establish a recessed inner diameter (and which while hidden from view in the exploded view of FIG. 3, is generally understood to exist from a vantage point referenced by directional arrow 16 as well as the cutaway view in FIG. 8). The base plate is secured to a first selected one of the seat back and seat bottom (again not shown).

An inwardly teethed and package supporting sector is shown and includes an inner and support sector surface 18 secured to a second selected one of the seat back and seat bottom. An outer perimeter portion 20 of the support sector is shown, relative to the inner sector surface 18, and such that the inwardly directed teeth, see for example at 22, extend in inwardly directed fashion about an entire inner circular periphery of the package supporting sector.

Illustrated at 24 and 26 are apertures designed in surface 18 locations of the sector supporting component, these design primarily as weight saving features. Although not clearly evident in FIG. 3, it is understood that such apertures can he formed at desired locations within either of the supporting surfaces associated with the base plate (see further at 28) or the package supporting (or locating) sector, these being arranged in cooperation with pluralities of structural located projections (with subsequent reference being made to FIGS. 4 and 5 and as will be described provide both locating and guiding support to the cam, locking pawls and anti-chuck pawls in their sector clearance defined and interacting relationships) arranged within a package defining space established by the sandwiched engagement of the base plate and package supporting sector, these providing for secure seating, location and co-acting motion of the various components assembled within the package, or component receiving, space (as will be described), as well as ensuring correct and selective rotation of the base plate relative to the packaging support sector.

Figure 4:
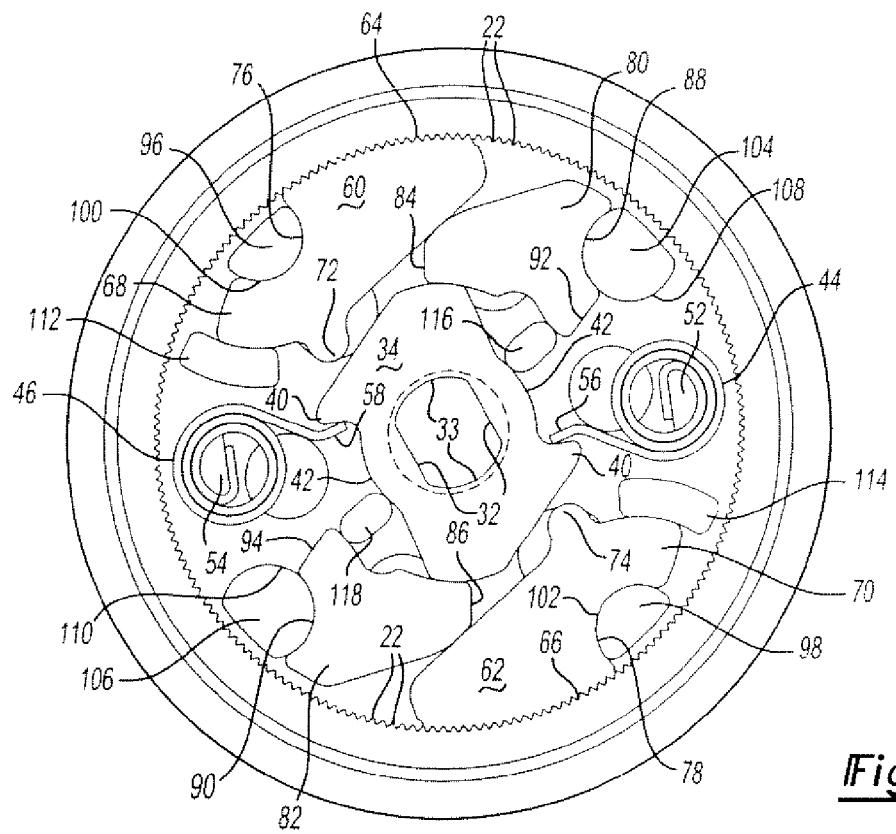
FIG. 4 is a sectioned plan view of the assembled disc package assembly, with the base support removed, and illustrating the rotatably biased central cam influencing the anti-chuck pawls and, indirectly, the locking pawls in their outwardly teethed and biasing engagement with the inwardly teethed plate sector.
Figure 5:
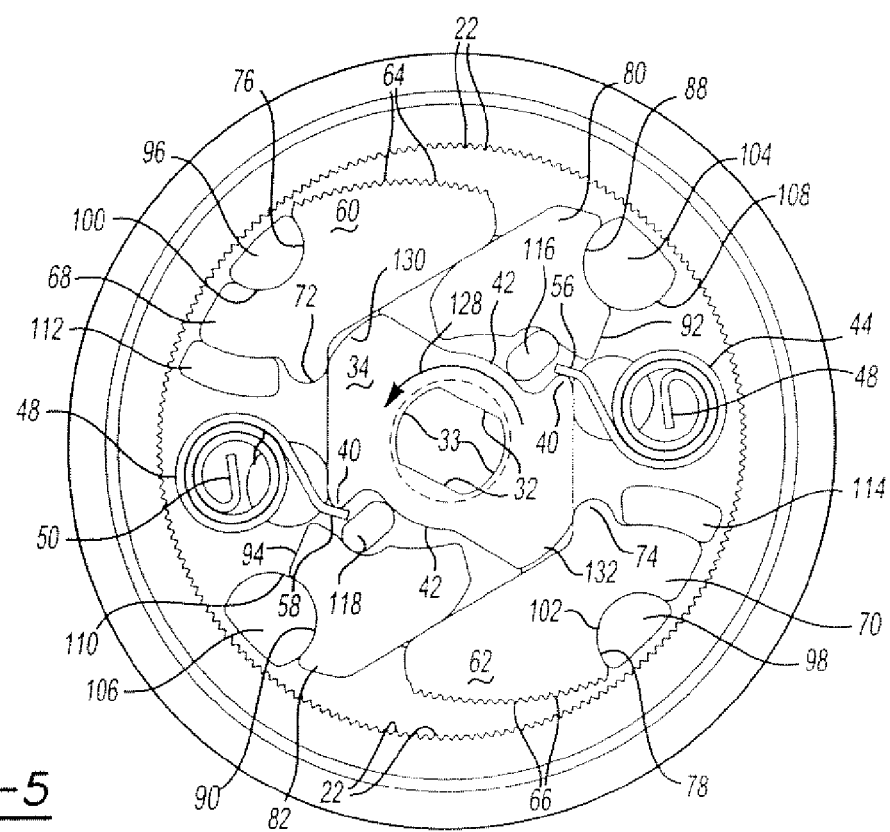
FIG. 5 is a succeeding sectioned plan view illustrating the clockwise rotation of the central cam, and the resultant actuation of the locking pawls in an inwardly and displaced fashion relative to the inwardly teethed sector.

A shaft, see at generally referenced by splined component 30 in FIG. 8 (this for the purpose of operating as a lever and with the splines receiving a handle or the like, also not shown) and as is further referenced by keyed edges, see linear side walls 32 and arcuate end walls 33, as defined in FIGS. 4 and 5. As referenced in FIG. 8, the splined shaft (or lever supporting component) 30 projects through the base plate and supporting sector, and further such that the keyed locations 32 and 33 are in general (and as will be discussed an intentional misalignment creating) alignment with the cam aperture.

The cam as previously described is shown at 34 and within which is defined the generally centrally located aperture through which the lever supporting shaft 30 extends. In particular, the central cam aperture exhibits a keyed inner profile established by parallel side walls 36, connected by arcuate end walls 38. As illustrated in each of FIGS. 4-7, the a misalignment tolerancing is established between the inwardly facing keyed surfaces (linear side walls 32 and arcuate end walls 33) of the lever supporting shaft 30 and the opposing and inwardly facing side and interconnecting end wall surfaces 36 and 38 of the cam aperture.

In this fashion, the cam 34 is supported within the component receiving space in a selected and rotationally biased and slaved fashion relative to the shaft 30, and while still permitting for incremental (as well as eccentric) of set motion in order to compensate for the dimensional tolerancing (sector clearances) associated with the other associated package defining components (again the locking pawls and anti-chuck pawls as will be discussed).

Additional features associated with the cam 34 include projecting shoulder locations see at 40, these being arranged in offset fashion relative to additional and arcuate edges 42. A pair of clock springs, see at 44 and 46, are provided, each including a central inner curled portion (at 48 and 50) which seats within a selected support location (at 52 and 54) associated with a selected one of the supporting plates (in this case the base plate). Extending finger locations, at 56 and 58, of the coil springs 44 and 46 engage the opposite located shoulder locations 40 of the cam 34, and thereby to bias the cam in a first selected direction, clockwise in the instance of FIGS. 4 and 5, and counterclockwise in the further instance of the mirrored arrangement of FIGS. 6 and 7.

A pair of locking pawls, see at 60 and 62, are provided, each exhibiting an outer arcuate and exteriorly toothed surface, at 64 and 66 respectively, and which are selectively displaceable to engage with inwardly teethed locations 22 associated with the package supporting sector. Additional features associated with the locking pawls 60 and 62 (the purposes for which will be subsequently described) include arcuate tail portions 68 and 70, an inwardly projecting (bulbous) locations 72 and 74, and inwardly recessed semi-circular locations 76 and 78 positioned along outer facing surfaces of the locking pawls 60 and 62, and which separate the exterior teethed locations 64 and 66 from the arcuate tail locations 68 and 70.

A pair of anti-chuck pawls 80 and 82, are associated with further locations of the component/package receiving space and, as will be discussed, are provided in part so as to be selectively engagable both by the cam 34 and with the locking pawls 60 and 62 in order to further distributed the necessary package sector clearances between the components. The anti-chuck pawls 80 and 82 each include, in part, an inwardly tapered and blunt nose end surface, see at 84 and 86 respectively, as well as opposite located and inwardly recessed semi-circular locations 88 and 90. Additional tail portions 92 and 94, these being reduced in sized in comparison to those associated with the locking pawls (particularly at 68 and 70) are associated with the anti-chuck cams 80 and 82.

As clearly shown in FIG. 3, each of the cam 34, locking pawls 60 and 62, and anti-chuck pawls 80 and 82, exhibiting planar upper and lower surfaces separated by a specified thickness and so that they can be matingly seated within the package defining space established between the opposing inner surfaces of the base plate and inwardly teethed/package receiving sector. As stated previously, and in order to maintain the components in their desired spatial arrangement, while still providing the necessary sector clearance defining and interactive motion, a plurality of individual and fixed structural projections are necessary. The fixed components can extend from locations associated with either or both the support sector surface or the opposing base plate surface (in the illustrated embodiment they are illustrated as protecting from the base plate), and for controlling actuating motion of at least one of said cam locking pawls and anti-chuck pawls.

Referring to FIGS. 3 and 4, the structural projections further include a first plurality of outer perimeter located projections, this including a first smaller diameter pair 96 and 98, each exhibiting an inwardly facing and circular profile, at 100 and 102 and which are arranged in opposing and seating fashion with respect to the inwardly recessed locations 88 and 90 associated with the locking pawls.

A second, larger diameter pair of projections 104 and 106 are provided in association with the anti-chuck pawls 80 anti 82. As with the first pair of projections 96 and 98, each exhibits an inwardly facing and circular profile, see at 108 and 110, and which are likewise arranged in opposing and seating fashion with respect to the inwardly recessed locations 88 and 90 associated with the anti-chuck pawls 80 and 82.

The first and second pairs of projections 96 & 98 and 104 and 106 are designed to matingly configure and to influence the locking and anti-chuck pawls to displaceable, such as an a pseudo pivoting and rotational fashion, around the fixed outer projections, in response to actuation of the cam. This is evident from the locations of the locking pawls and anti-chuck pawls corresponding to each of FIGS. 4 and 5.

The fixed structural projections further include a third pair of elongated and arcuate shaped projections, see at 112 and 114, defined at perimeter-proximate and spaced distances from the first pair 96 and 98. In this fashion, the arcuate tail portion associated with each of the locking pawls, again at 68 and 70, is capable of being displaceably and guidably restrained between the opposing pairs of projections, i.e. 96 & 112 and 98 & 114.

A fourth pair of radially directed and elongate-ellipsoidal projections, see at 116 and 118, are positioned in colinear extending and intermediate locations within the package defined space. The fourth projections 116 and 118 extend between first contacting locations with the outwardly facing surfaces and contoured surfaces 42 of the rotating cam 34, to second contacting locations, at stem or tail portions 92 and 94 associated with the anti-chuck pawls 80 and 82.

Referring once again to FIG. 3, an outer retention ring is illustrated at 120 and exhibits an other perimeter sufficiently contoured such that it is capable of abuttingly overlaying a rear facing outer perimeter of the supporting sector 18, and so that the ring 120 can engage with the larger diameter (via the lip 14) of the base plate 12 in order to fixedly located the supporting sector 18 while permitting it the necessary rotation relative to the base plate 12. To this end, a plurality of circularly arrayed fasteners (such as bolts 122 which are shown in FIG. 2) are inserted through apertures 124 in the retention ring 120 (again FIG. 3) as well as aligning apertures (not shown in FIG. 3) and which can be provided in the opposing and aligning surface of the base plate 12. Additional apertures (not shown) can be provided if needed for securing the support sector 18, and provided that the arrangement and nature of such fasteners does not compromise the required inter-rotational relationship between the base and support sectors.

As again shown in FIG. 4, which is a plan view of the assembled disc package assembly, with the base support removed, specifically illustrating is rotatably biased central cam 34 influencing the anti-chuck pawls 80 and 82 and thereby indirectly, the locking pawls 60 and 62, in their outwardly teethed and biasing engagement with the inwardly teethed plate sector 18. As further shown in FIG. 5, the clockwise rotation, see arrow 128, of the central cam 34, and the resultant actuation of the locking pawls 60 and 62 in an inwardly and displaced fashion relative to the inwardly teethed sector 18, this again caused by additional edge shoulder locations 130 and 132 of the cam 34 contacting the bulbous inner portions 72 and 74, causes the locking pawls to inwardly displace and to thereby again permit rotation between the base plate and package supporting sector. It is also envisioned that the anti-chuck pawls can be reconfigured, such as for example to linearly translate or, in combination, both rotate and translate in order to facilitate engagement of the locking pawls with the outer ring array.

Figure 6:
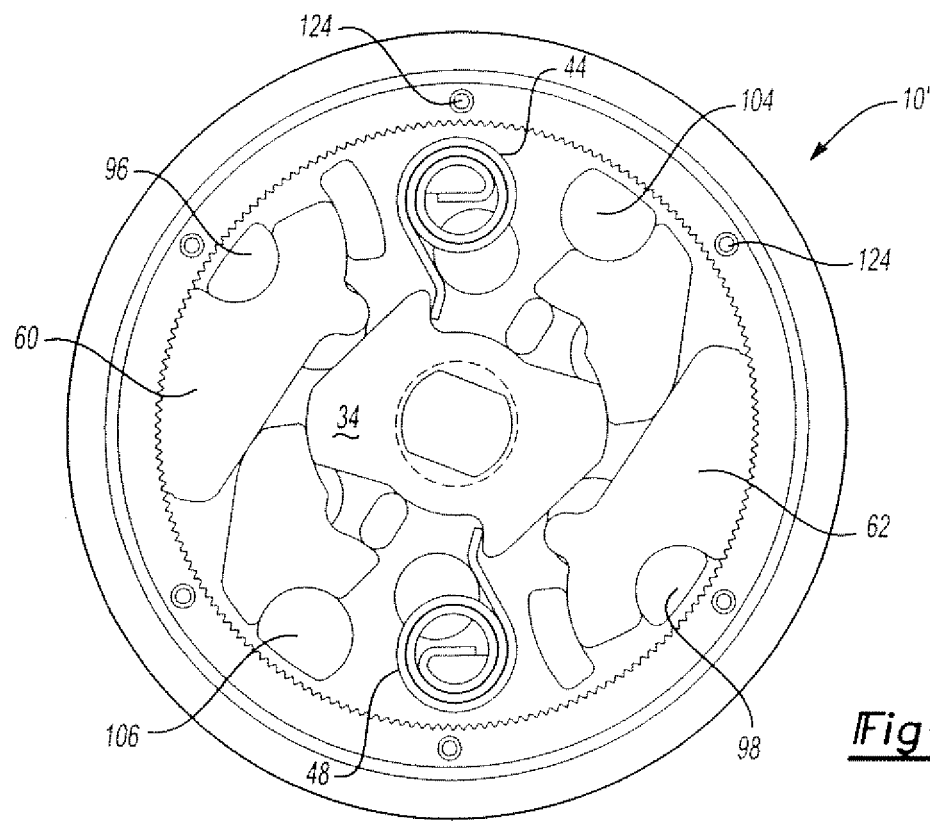
FIG. 6 is a plan view illustration similar to that shown in FIG. 4 of an opposite side disc package assembly, and additionally illustrating in superimposed fashion the associated base cover for establishing a minor misalignment permitting arrangement with the cam and pairs of locking and anti-chuck pawls.
Figure 7:
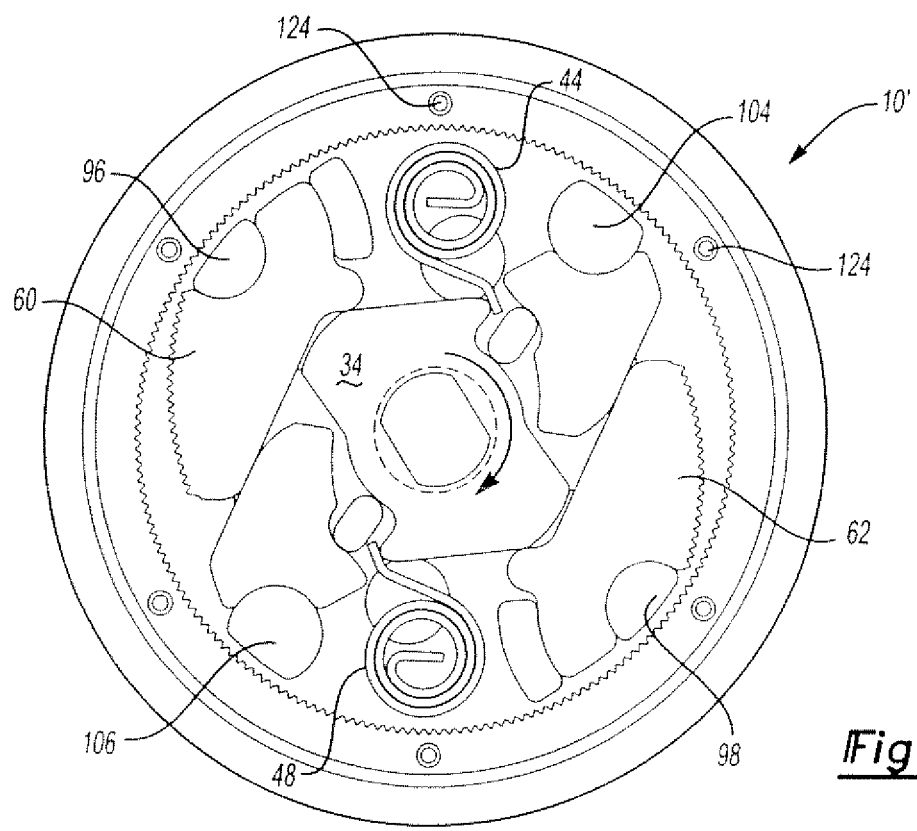
FIG. 7 is a succeeding plan view of a clockwise rotation of the central cam, with resultant actuation of the locking pawls in an inwardly and displaced condition relative to the inwardly teethed sector.

FIG. 6 is a plan view illustration, generally at 10', similar to that shown in FIG. 4 of an opposite side disc package assembly, and additionally illustrating in superimposed fashion the associated base cover for establishing a minor misalignment permitting arrangement with the cam and pairs of locking and anti-chuck pawls. For purposes of both clarity and ease of illustration, a detailed and repetitive description of all of the components associated with the variant of FIGS. 1-5 is not provided, it being understood that FIGS. 6 and 7 are intended to reflect that inner components can be shaped and installed in a mirroring and reverse fashion, and such that an additional package assembly is capable of being installed in an outboard and hinge proximate location associated with either a left or right door side of a vehicle. Along these lines, FIG. 7 is a succeeding plan view of a clockwise rotation of the central cam, see arrow 134, with resultant actuation of the locking pawls arranged in an inwardly and displaced condition relative to the inwardly teethed sector.

Having described our invention, other and additional preferred embodiments will become apparent to those skilled in the art to which it pertains. Specifically, it is also envisioned that additional pluralities of locking and anti-chuck pawls (such as for example an arrangement of three apiece) can be incorporated into a revised package assembly and without departing from the scope of the appended claims.

The invention claimed is:

1. A seat recliner assembly established at a hinge location between a seat bottom and a pivotally associated seat back, comprising:
    a base plate secured to a first selected one of the seat back and seat bottom;
    an inwardly teethed and package supporting sector secured to a second selected one of the seat back and seat bottom, said base plate and said package supporting sector being sandwichingly engaged in selectively rotatable fashion relative to one another to define a component receiving space therebetween;
    a shaft projects through said base plate and supporting sector, a cam including an aperture through which said shaft extends, said cam being supported within said component receiving space in a selected and rotationally biased and slaved fashion relative to said shaft;
    a pair of locking pawls each exhibiting an outer arcuate and exteriorly toothed surface and which are selectively displaceable to engage with inwardly teethed locations associated with said package supporting sector;
    a pair of anti-chuck pawls associated with further locations of said component receiving space said anti-chuck pawls being inter-disposed between said cam and said locking pawls in spaced and non-contacting fashion relative to said inwardly teethed and package supporting sector; and
    said cam being biased in a first rotational locking condition in order to influence said anti-chuck pawls outwardly against said locking pawls to maintain said locking pawls in teethed engagement with said inwardly teethed sector, said cam being rotated in an opposite and counter-biasing direction, thereby directly contacting said locking pawls and pivoting the same such that said exteriorly toothed surfaces are inwardly disengaged from said teethed sector, permitting rotation between said base plate and package supporting sector;
    arrangement of said cam, locking pawls and anti-chuck pawls further providing enhanced distribution of necessary sector clearances across the package defining space to reduce the incidences of chucking and locking of package components.

2. The seat recliner assembly as described in claim 1, said shaft further comprising a keyed portion for rotating said cam.

3. The seat recliner assembly as described in claim 2, further comprising a misalignment tolerancing defined between at least said keyed portion and an inner surface associated with said cam aperture and for permitting misalignment of said cam within a coplanar space associated with said package supporting sector and defined with said locking pawls and anti-chuck pawls.

4. The seat recliner assembly as described in claim 1, further comprising a pair of clock springs secured at first and second locations within said package receiving space, extending finger locations associated with said springs engaging shoulder locations of said cam and biasing said cam in said locking direction.

5. The seat reclining assembly as described in claim 4, said cam further comprising arcuate edges offset from said shoulder locations and which selectively engage said anti-chuck pawls in said first rotational condition and said locking pawls in said counter-biasing direction.

6. The seat reclining assembly as described in claim 5, said locking pawls each further comprising an inwardly projecting location engaged by said arcuate cam edges during said counter-biasing rotation.

7. The seat recliner assembly as described in claim 1, said base plate and said package supporting sector each exhibiting a circular outer profile, said base plate having a perimeter extending lip defining an inner recessed diameter, said package supporting sector having an outer diameter which matingly seats within said inner recessed diameter.

8. The seat recliner assembly as described in claim 7, further comprising an outer retention ring installing over a rear facing outer perimeter of said supporting sector and engageable with said base plate perimeter extending lip.

9. The seat recliner assembly as described in claim 8, further comprising at least one plurality of circular arrayed fasteners securing said outer retention ring to said base plate, thereby sandwiching said package supporting sector in rotatable fashion therebetween.

10. A seat recliner assembly established at a hinge location between a seat bottom and a pivotally associated seat back and for providing enhanced distribution of necessary sector clearances across a package defining space and to reduce the incidences of chucking and locking of package components, comprising:
    a base plate secured to a first selected one of the seat back and seat bottom;
    an inwardly teethed and package supporting sector secured to a second selected one of the seat back and seat bottom, said base plate and package supporting sector each exhibiting a circular outer profile, said base plate further including a perimeter extending lip such that said package supporting sector is capable of being sandwichingly engaged in selectively rotatable fashion relative to said base plate and to define a component receiving space therebetween;
    an outer retention ring installed over a rear facing surface of said supporting sector and engageable by outer perimeter located fasteners with said base plate perimeter extending lip;
    a shaft projects through said base plate and supporting sector, a cam including an aperture through which said shaft extends, said cam being supported within said component receiving space in a selected and rotationally biased and slaved fashion by a pair of clock springs secured at first and second locations within said package receiving space, extending finger locations associated with said springs engaging shoulder locations of said cam and biasing said cam in said locking direction relative to said shaft, said shaft further comprising a keyed portion for rotating said cam, a misalignment tolerancing defined between at least said keyed portion and an inner surface associated with said cam aperture and for permitting misalignment of said cam within a coplanar space associated with said package supporting sector;
    a pair of locking pawls each exhibiting an outer arcuate and exteriorly toothed surface and which are selectively displaceable to engage with inwardly teethed locations associated with said package supporting sector;

a pair of anti-chuck pawls associated with further locations of said component receiving space, said anti-chuck pawls being inter-disposed between said cam and said locking pawls in spaced and non-contacting fashion relative to said inwardly teethed and package supporting sector; and said cam being biased in a first rotational locking condition in order to influence said anti-chuck pawls outwardly against said locking pawls to maintain said locking pawls in teethed engagement with said inwardly teethed sector, said cam being rotated in an opposite and counter-biasing direction, thereby directly contacting inwardly projecting locations associated with each of said locking pawls, and in order to pivot the same such that said exteriorly toothed surfaces are inwardly disengaged from said teethed sector, thereby permitting rotational movement between said base plate and package supporting sector 11. The seat reclining assembly as described in claim 10, said component space defining surface associated with said package support sector further comprising a plurality of fixed structural projections extending from locations associated with at least one of a surface of said support sector and an opposing base plate surface, and for controlling actuating motion of at least one of said cam, locking pawls and anti-chuck pawls.

12. The seat reclining assembly as described in claim 11, said structural projections further comprising a first plurality of outer perimeter located projections, each exhibiting an inwardly facing and circular profile, said locking pawls and anti-chuck pawls being matingly configured to be displaceable around said fixed outer projections and in response to actuation of said cam 13. The seat reclining assembly as described in claim 12, said first plurality of outer perimeter located structural projections further comprising a first smaller diameter pair for guiding displacing motion of said locking pawls and a second larger diameter pair for guiding said anti-chuck pawls.

14. The seat reclining assembly as described in claim 13, said fixed structural projections further comprising a third pair of elongated and arcuate shaped projections defined at perimeter-proximate and spaced distances from said first pair, an arcuate tail portion associated with each of said locking pawls being displaceably and guidably restrained between said opposing pairs of projections.

15. The seat reclining assembly as described in claim 13, said fixed structural projections further comprising a fourth pair of radially directed and elongate-ellipsoidal projections positioned in colinear extending and intermediate locations, said fourth projections extending from first contacting locations with outwardly facing surfaces of said rotating cam to second contacting locations with inwardly facing surfaces of said anti-chuck pawls.

16. The seat reclining assembly as described in claim 13, said anti-chuck pawls each further comprising an inwardly tapered and blunt nose end surface opposite said larger diameter structural projections.

17. The seat reclining assembly as described in claim 10, said cam further comprising arcuate edges offset from said shoulder locations and which selectively engage said anti-chuck pawls in said first rotational condition and said locking pawls in said counter-biasing direction.

18. The seat reclining assembly as described in claim 17, said locking pawls each further comprising an inwardly projecting location engaged by said arcuate cam edges during said counter-biasing rotation.

19. A seat recliner assembly established at a hinge location between a seat bottom and a pivotally associated seat back, comprising:

a base plate secured to a first selected one of the seat back and seat bottom;

an inwardly teethed and package supporting sector secured to a second selected one of the seat back and seat bottom, said base plate and said package supporting sector being sandwichingly engaged in selectively rotatable fashion relative to one another to define a component receiving space therebetween;

a shaft projects through said base plate and supporting sector, a cam including an aperture through which said shaft extends, said cam being supported within said component receiving space in a selected and rotationally biased and slaved fashion relative to said shaft;

a pair of locking pawls each exhibiting an outer arcuate and exteriorly toothed surface and which are selectively displaceable to engage with inwardly teethed locations associated with said package supporting sector;

a pair of anti-chuck pawls associated with further locations of said component receiving space and being selectively engagable both by said cam and with said locking pawls;

said component space defining surface associated with said package support sector further comprising a plurality of fixed structural projections extending from locations associated with at least one of a surface of said support sector and at opposing base plate surface, and for controlling actuating motion of at least one of said cam, locking pawls and anti-chuck pawls;

said structural projections further comprising a first plurality of outer perimeter located projections, each exhibiting an inwardly facing and circular profile, said locking pawls and anti-chuck pawls being matingly configured to be displaceable around said fixed outer projections and in response to actuation of said cam;

said first plurality of outer perimeter located structural projections further comprising a first smaller diameter pair for guiding displacing motion of said locking pawls and a second larger diameter pair for guiding said anti-chuck pawls; and said cam being biased in a first rotational locking condition in order to influence said anti-chuck pawls outwardly against said locking pawls, said cam being rotated in an opposite and counter-biasing direction, thereby directly contacting said locking pawls and pivoting the same such that said exteriorly toothed surfaces are inwardly disengaged from said teethed sector, permitting rotation between said base plate and package supporting sector;

arrangement of said cam, locking pawls and anti-chuck pawls further providing enhanced distribution of necessary sector clearances across the package defining space to reduce the incidences of chucking and locking of package components.

20. The seat reclining assembly as described in claim 19, said fixed structural projections further comprising a third pair of elongated and arcuate shaped projections defined at perimeter-proximate and spaced distances from said first pair, an arcuate tail portion associated with each of said locking pawls being displaceably and guidably restrained between said opposing pairs of projections.

21. The seat reclining assembly as described in claim 19, said fixed structural projections further comprising a fourth pair of radially directed and elongate-ellipsoidal projections positioned in colinear extending and intermediate locations, said fourth projections extending from first contacting locations with outwardly facing surfaces of said rotating cam to second contacting locations with inwardly facing and additional arcuate tail defining surfaces of said anti-chuck pawls.

22. The seat reclining assembly as described in claim 19, said anti-chuck pawls each further comprising an inwardly tapered and blunt nose end surface opposite said larger diameter structural projections.

23. The seat reclining assembly as described in claim 19, at least one of said base plate and said package supporting sector further comprising a plurality of apertures at locations associated with said sector surface and said base plate surface, located in offset fashion relative to said structural projections.

* * * * *